US012316563B2

(12) United States Patent
Gao et al.

(10) Patent No.: US 12,316,563 B2
(45) Date of Patent: May 27, 2025

(54) METHODS FOR COMMUNICATION, TERMINAL DEVICE, NETWORK DEVICE, AND COMPUTER READABLE MEDIUM

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 255 days.

(21) Appl. No.: 17/764,853

(22) PCT Filed: Sep. 30, 2019

(86) PCT No.: PCT/CN2019/109623
§ 371 (c)(1),
(2) Date: Mar. 29, 2022

(87) PCT Pub. No.: WO2021/062719
PCT Pub. Date: Apr. 8, 2021

(65) Prior Publication Data
US 2023/0006783 A1 Jan. 5, 2023

(51) Int. Cl.
*H04L 5/00* (2006.01)

(52) U.S. Cl.
CPC ............ *H04L 5/005* (2013.01); *H04L 5/0007* (2013.01); *H04L 5/0044* (2013.01); *H04L 5/0094* (2013.01)

(58) Field of Classification Search
CPC ..... H04L 5/005; H04L 5/0007; H04L 5/0044; H04L 5/0094
See application file for complete search history.

(56) References Cited

U.S. PATENT DOCUMENTS

| 11,323,300 B2* | 5/2022 | Hessler ............... H04L 5/001 |
| 2018/0091350 A1* | 3/2018 | Akkarakaran ........ G01S 13/346 |
| 2019/0044673 A1* | 2/2019 | Maleki ................ H04L 5/0051 |

(Continued)

FOREIGN PATENT DOCUMENTS

| CN | 109802796 A | 5/2019 |
| CN | 110034853 A | 7/2019 |

(Continued)

OTHER PUBLICATIONS

International Search Report for PCT/CN2019/109623 dated Jun. 29, 2020 [PCT/ISA/210].

(Continued)

*Primary Examiner* — Jael M Ulysse
(74) *Attorney, Agent, or Firm* — Sughrue Mion, PLLC

(57) ABSTRACT

Embodiments of the present disclosure provide a solution for. In a method for communication, a terminal device receives, from a network device, control information indicating a set of resources and transmission configuration indicator (TCI) states for a communication between the terminal device and the network device. The terminal device determines resource subsets associated with the respective TCI states, each resource subset being a part of the set of resources in frequency domain. The terminal device determines a mapping of phase-tracking reference signals (PT-RSs) to the resource subsets. Embodiments of the present disclosure provide practical details on how to decide PT-RS presence/density/pattern/offset if a scheduled set of resources are shared by a plurality of TCI states, especially in case of scheme 2a/2b.

18 Claims, 4 Drawing Sheets

(56) References Cited

U.S. PATENT DOCUMENTS

| | | | |
|---|---|---|---|
| 2019/0356437 A1* | 11/2019 | Zhong | H04W 72/04 |
| 2020/0052740 A1* | 2/2020 | Zhang | H04L 5/0048 |
| 2020/0107307 A1* | 4/2020 | Nammi | H04L 5/0051 |
| 2020/0228280 A1* | 7/2020 | Yang | H04L 5/0051 |
| 2020/0252172 A1* | 8/2020 | Xi | H04L 27/26134 |
| 2020/0266861 A1* | 8/2020 | Nammi | H04B 7/0486 |
| 2020/0351892 A1* | 11/2020 | Yi | H04L 5/0092 |
| 2021/0175937 A1* | 6/2021 | Yamada | H04W 16/28 |
| 2022/0006581 A1* | 1/2022 | Yamada | H04B 7/088 |
| 2022/0006582 A1* | 1/2022 | Yamada | H04W 72/1273 |
| 2022/0052749 A1* | 2/2022 | Guo | H04W 76/19 |
| 2022/0077982 A1* | 3/2022 | Zhang | H04L 5/0014 |
| 2022/0095350 A1* | 3/2022 | Lee | H04W 74/0833 |
| 2022/0116144 A1* | 4/2022 | Liu | H04L 5/0044 |
| 2022/0200687 A1* | 6/2022 | Guo | H04L 5/0053 |

FOREIGN PATENT DOCUMENTS

| | | |
|---|---|---|
| WO | 2018/064313 A1 | 4/2018 |
| WO | 2018/230900 A1 | 12/2018 |
| WO | 2019/049096 A1 | 3/2019 |
| WO | 2019/090774 A1 | 5/2019 |
| WO | 2019/096284 A1 | 5/2019 |
| WO | 2019/096292 A1 | 5/2019 |
| WO | 2019/135650 A1 | 7/2019 |
| WO | 2019/137441 A1 | 7/2019 |

OTHER PUBLICATIONS

Written Opinion for PCT/CN2019/109623 dated Jun. 29, 2020 [PCT/ISA/237].
Notification of Reasons for Refusal dated May 2, 2023 in Japanese Patent Application No. 2022-520042.
LG Electronics, "Enhancements on multi-TRP/panel transmission", 3GPP TSG RAN WG1 Meeting #98, R1-1908699, Prague, CZ, Aug. 26-30, 2019 (19 pages total).
Qualcomm Incorporated, "Multi-TRP Enhancements", 3GPP TSG-RAN WG1 Meeting #97, R1-1907289, Reno, Nevada, USA, May 13-17, 2019 (25 pages total).
ZTE , "Enhancements on Multi-TRP and Multi-panel Transmission", 3GPP TSG RAN WG1 #98, R1-1908191, Prague, CZ, Aug. 26-30, 2019 (21 pages total).
Extended European Search Report dated Sep. 9, 2022 from the European Patent Office in EP Application No. 19947519.5.
Office Action dated Oct. 18, 2022 from the Intellectual Property Office of India in IN Application No. 202217023230.
Chinese Office Action dated Jan. 26, 2025 in Application No. 201980102649.5.

* cited by examiner

METHODS FOR COMMUNICATION, TERMINAL DEVICE, NETWORK DEVICE, AND COMPUTER READABLE MEDIUM

CROSS REFERENCE TO RELATED APPLICATIONS

This application is a National Stage of International Application No. PCT/CN2019/109623 filed Sep. 30, 2019.

FIELD

Embodiments of the present disclosure generally relate to the field of communication, and more particularly, to a solution for configuring phase-tracking reference signals (PT-RSs).

BACKGROUND

In the 3GPP meeting RAN #81, a new work item (WI) for NR eMIMO was approved including the following aspects. First, it is to provide enhancements on Multi-user (MU)-Multiple Input Multiple Output (MIMO) support. Specifically, it is to specify overhead reduction, based on Type II Channel State Information (CSI) feedback, taking into account the tradeoff between performance and overhead. It is to perform study and, if needed, specify extension of Type II CSI feedback to rank>2. Second, it is to provide enhancements on multi-TRP/panel transmission including improved reliability and robustness with both ideal and non-ideal backhaul. In particular, it is to specify downlink control signaling enhancement(s) for efficient support of non-coherent joint transmission. It is to perform study and, if needed, specify enhancements on uplink control signaling and/or reference signal(s) for non-coherent joint transmission. Multi-TRP techniques for Ultra-Reliable Low latency Communications (URLLC) requirements are included in this WI.

Third, it is to provide enhancements on multi-beam operation, primarily targeting FR2 operation. Specifically, it is to perform study and, if needed, to specify enhancement(s) on uplink (UL) and/or downlink (DL) transmit beam selection specified in Rel-15 to reduce latency and overhead. It is to specify UL transmit beam selection for multi-panel operation that facilitates panel-specific beam selection. It is to specify a beam failure recovery for secondary cell (SCell) based on the beam failure recovery specified in Rel-15. It is to specify measurement and reporting of either L1—Reference Signal Received Quality (RSRQ) or L1—Signal to Interference plus Noise Ratio (SINR). Fourth, it is to perform study and make conclusion in the first RAN1 meeting after start of the WI, and if needed, specify CSI-RS and Demodulation Reference Signal, DMRS (both downlink and uplink) enhancement for Peak to Average Power Ratio (PAPR) reduction for one or multiple layers (no change on resource element, RE, mapping specified in Rel-15).

SUMMARY

In general, example embodiments of the present disclosure provide a solution for configuring phase-tracking reference signals (PT-RSs).

In a first aspect, there is provided a method for communication. The method comprises receiving, at a terminal device from a network device, control information indicating a set of resources and transmission configuration indicator (TCI) states for a communication between the terminal device and the network device. The method also comprises determining resource subsets associated with the respective TCI states, each resource subset being a part of the set of resources in frequency domain. The method further comprises determining a mapping of PT-RSs to the resource subsets.

In a second aspect, there is provided a method for communication. The method comprises transmitting, at a network device to a terminal device, control information indicating a set of resources and TCI states for a communication between the terminal device and the network device. The method also comprises determining resource subsets associated with the respective TCI states, each resource subset being a part of the set of resources in frequency domain. The method further comprises determining a mapping of PT-RSs to the resource subsets.

In an third aspect, there is provided a terminal device. The terminal device comprises a processor and a memory storing instructions. The memory and the instructions are configured, with the processor, to cause the terminal device to perform the method according to the first aspect.

In a fourth aspect, there is provided a network device. The network device comprises a processor and a memory storing instructions. The memory and the instructions are configured, with the processor, to cause the network device to perform the method according to the second aspect.

In a fifth aspect, there is provided a computer readable medium having instructions stored thereon. The instructions, when executed on at least one processor of a device, cause the device to perform the method according to the first aspect or the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION OF EMBODIMENTS

Figure 1:
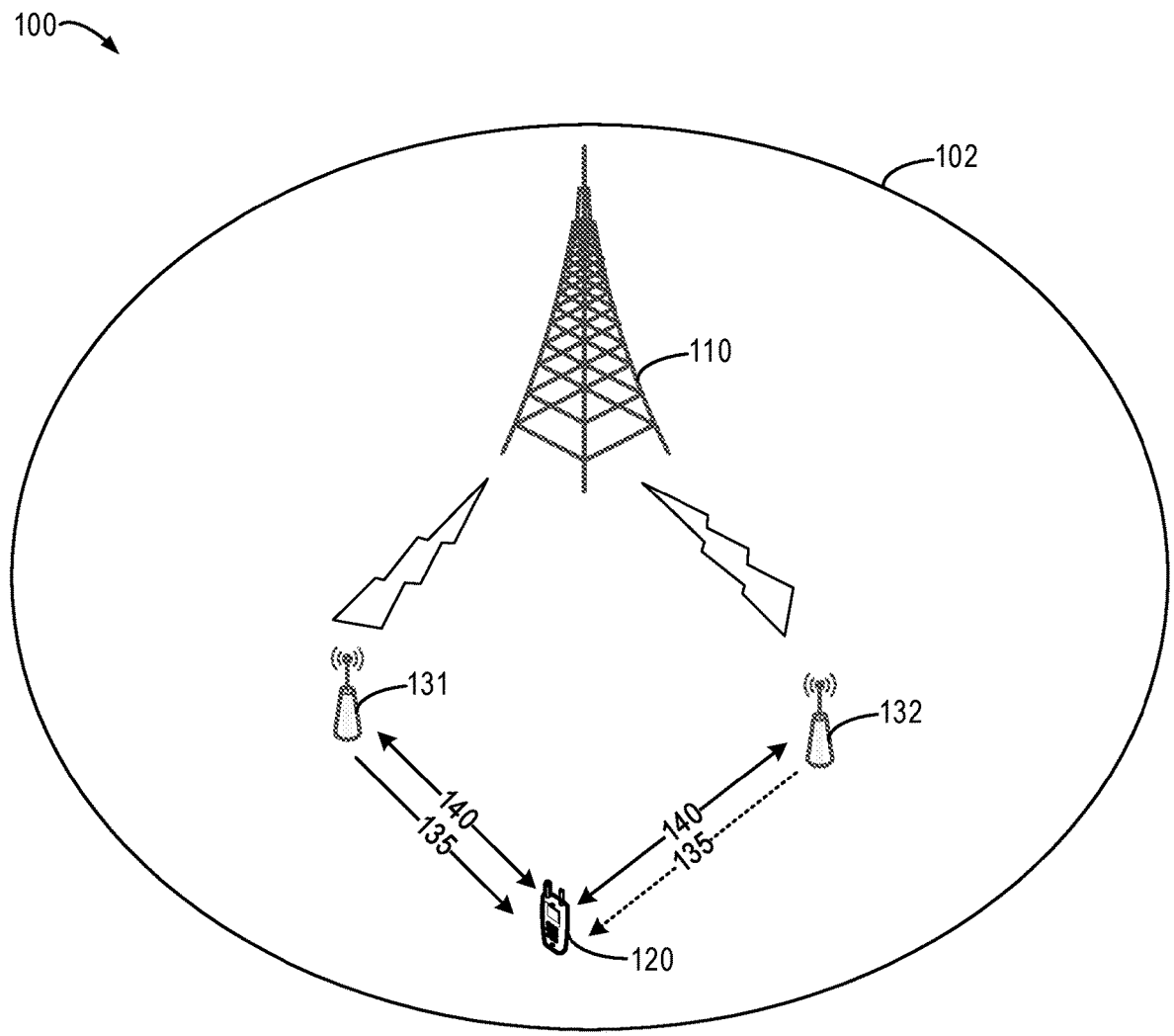
FIG. 1 is a schematic diagram of a communication environment in which some embodiments of the present disclosure can be implemented.

Principles of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), an infrastructure device for a V2X (vehicle-to-everything) communication, a Transmission/Reception Point (TRP), a Remote Radio Unit (RRU), a radio head (RH), a remote radio head (RRH), a low power node such as a femto node, a pico node, and the like.

As used herein, the term "terminal device" refers to any device having wireless or wired communication capabilities. Examples of the terminal device include, but not limited to, user equipment (UE), vehicle-mounted terminal devices, devices of pedestrians, roadside units, personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UEs as examples of terminal devices and the terms "terminal device" and "user equipment" (UE) may be used interchangeably in the context of the present disclosure.

In one embodiment, a terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is an eNB and the second RAT device is a gNB. Information related to different RATs may be transmitted to the terminal device from at least one of the first network device and the second network device. In one embodiment, first information may be transmitted to the terminal device from the first network device and second information may be transmitted to the terminal device from the second network device directly or via the first network device. In one embodiment, information related to configuration for the terminal device configured by the second network device may be transmitted from the second network device via the first network device. Information related to reconfiguration for the terminal device configured by the second network device may be transmitted to the terminal device from the second network device directly or via the first network device.

As used herein, the term "transmission reception point," "transmission/reception point," or "transmission and reception point" may generally indicate a station communicating with the user equipment. However, the transmission and reception point may be referred to as different terms such as a base station (BS), a cell, a Node-B, an evolved Node-B (eNB), a next generation NodeB (gNB), a Transmission Reception Point (TRP), a sector, a site, a base transceiver system (BTS), an access point (AP), a relay node (RN), a remote radio head (RRH), a radio unit (RU), an antenna, and the like.

That is, in the context of the present disclosure, the transmission and reception point, the base station (BS), or the cell may be construed as an inclusive concept indicating a portion of an area or a function covered by a base station controller (BSC) in code division multiple access (CDMA), a Node-B in WCDMA, an eNB or a sector (a site) in LTE, a gNB or a TRP in NR, and the like. Accordingly, a concept of the transmission and reception point, the base station (BS), and/or the cell may include a variety of coverage areas such as a mega-cell, a macro-cell, a micro-cell, a pico-cell, a femto-cell, and the like. Furthermore, such concept may include a communication range of the relay node (RN), the remote radio head (RRH), or the radio unit (RU).

In the context of the present disclosure, the user equipment and the transmission/reception point may be two transmission/reception subjects, having an inclusive meaning, which are used to embody the technology and the technical concept disclosed herein, and may not be limited to a specific term or word. Furthermore, the user equipment and the transmission/reception point may be uplink or downlink transmission/reception subjects, having an inclusive meaning, which are used to embody the technology and the technical concept disclosed in connection with the present embodiment, and may not be limited to a specific term or word. Herein, an uplink (UL) transmission/reception is a scheme in which data is transmitted from user equipment to a base station. Alternatively, a downlink (DL) transmission/reception is a scheme in which data is transmitted from the base station to the user equipment.

As used herein, the term "resource," "transmission resource," "resource block," "physical resource block" or "sidelink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, a resource in both frequency domain and time domain will be used as an example of a transmission resource for describing some embodiments of the present disclosure. It is noted that embodiments of the present disclosure are equally applicable to other resources in other domains.

As used herein, the singular forms "a," "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

FIG. 1 is a schematic diagram of a communication environment 100 in which some embodiments of the present disclosure can be implemented. The communication environment 100 includes a network device 110 and a terminal device 120 served by the network device 110. The serving area of the network device 110 may be called as a cell 102. In the communication environment 100, the network device 110 can transmit data and control information to the terminal device 120, and the terminal device 120 can also transmit data and control information to the network device 110. A communication link from the network device 110 to the terminal device 120 is referred to as a downlink (DL) or a forward link, whereas a communication link from the terminal device 120 to the network device 110 is referred to as an uplink (UL) or a reverse link.

As shown in FIG. 1, the network device 110 is coupled with two TRPs 131 and 132, and may communicate with the terminal device 120 via the two TRPs 131 and 132. For example, in a repeated transmission between the network 110 and the terminal device 120, such as in a multi-TRP URLLC transmission, the network device 110 may transmit or receive the same data 140 via the TRP 131 and the TRP 132. As used herein, the data 140 may include any data that can be transmitted between the network device 110 and the terminal device 120, including user plane data, control plane data, or the like. For example, the data 140 may be a Transport Block (TB) or a packet. In the following, the TRP 131 may also be referred to as a first TRP, while the TRP 132 may also be referred to as a second TRP. The first and second TRPs 131 and 132 may be included in a same serving cell (such as, the cell 102 as shown in FIG. 1) or different serving cells provided by the network device 110.

In some embodiments, the first and second TRPs 131 and 132 may be explicitly associated with different higher-layer configured identities. For example, a higher-layer configured index can be associated with a pre-defined Control Resource Set (CORESET), a pre-defined reference signal (RS), or a pre-defined Transmission Configuration Indication (TCI) state, which is used to differentiate between transmissions between different TRPs and the terminal device 120. When the terminal device 120 receives two DCIs from two CORESETs which are associated with different higher-layer configured identities, the two DCIs are indicated from different TRPs. Further, the first and second TRPs 131 and 132 may be implicitly identified by a dedicated configuration to the physical channels or signals. For example, a dedicated CORESET, a RS, and a TCI state, which are associated with a TRP, are used to identify a transmission from a different TRP to the terminal device 120. For example, when the terminal device 120 receives a DCI from a dedicated CORESET, the DCI is indicated from the associated TRP dedicated by the CORESET.

In the repeated transmission or reception via the two TRPs 131 and 132, the network device 110 may use a repetition scheme among a number of available repetition schemes. The repetition scheme may specify a transmission manner for the network device 110 to use the two TRPs 131 and 132 cooperatively, for example, a multiplexing scheme between the two TRPs 131 and 132, the respective resource allocations for the two TRPs 131 and 132, or the like.

For example, to facilitate further down-selection for one or more schemes in the 3GPP meeting RAN1 #96bis, some schemes for multi-TRP based URLLC scheduled by single DCI at least are clarified as following.

Scheme 1 (SDM): n (n<=$N_s$) TCI states within the single slot, with overlapped time and frequency resource allocation.

Scheme 1a: Each transmission occasion is a layer or a set of layers of the same TB, with each layer or layer set is associated with one TCI and one set of DMRS port(s). Single codeword with one RV is used across all spatial layers or layer sets. From the UE perspective, different coded bits are mapped to different layers or layer sets with the same mapping rule as in Rel-15.

Scheme 1b: Each transmission occasion is a layer or a set of layers of the same TB, with each layer or layer set is associated with one TCI and one set of DMRS port(s). Single codeword with one RV is used for each spatial layer or layer set. The RVs corresponding to each spatial layer or layer set can be the same or different. Codeword-to-layer mapping when total number of layers <=4 is for future study.

Scheme 1c: One transmission occasion is one layer of the same TB with one DMRS port associated with multiple TCI state indices, or one layer of the same TB with multiple DMRS ports associated with multiple TCI state indices one by one.

In addition, it is indicated that applying different MCS/modulation orders for different layers or layer sets can be discussed.

Scheme 2 (FDM): n (n<=$N_f$) TCI states are within the single slot, with non-overlapped frequency resource allocation. Each non-overlapped frequency resource allocation is associated with one TCI state. Same single/multiple DMRS port(s) are associated with all non-overlapped frequency resource allocations.

Scheme 2a: Single codeword with one RV is used across full resource allocation. From UE perspective, the common RB mapping (codeword to layer mapping as in Rel-15) is applied across full resource allocation.

Scheme 2b: Single codeword with one RV is used for each non-overlapped frequency resource allocation. The RVs corresponding to each non-overlapped frequency resource allocation can be the same or different.

In addition, it is indicated that applying different MCS/modulation orders for different non-overlapped frequency resource allocations can be discussed. It is also indicated that details of frequency resource allocation mechanism for FDM 2a/2b with regarding to allocation granularity, time domain allocation can be discussed.

Scheme 3 (TDM): n (n<=$N_{t1}$) TCI states within the single slot, with non-overlapped time resource allocation. Each transmission occasion of the TB has one TCI and one RV with the time granularity of mini-slot. All transmission occasion (s) within the slot use a common MCS with same single or multiple DMRS port(s). RV/TCI state can be same or different among transmission occasions. Channel estimation interpolation across mini-slots with the same TCI index is for future study.

Scheme 4 (TDM): n (n<=$N_{t2}$) TCI states with K (n<=K) different slots. Each transmission occasion of the TB has one TCI and one RV. All transmission occasion (s) across K slots use a common MCS with same single or multiple DMRS port(s). RV/TCI state can be same or different among transmission occasions. Channel estimation interpolation across slots with the same TCI index is for future study. It is noted that M-TRP/panel based URLLC schemes shall be compared in terms of improved reliability, efficiency, and specification impact. It is noted that support of number of layers per TRP may be discussed.

In addition, before transmitting the data 140 to the terminal device 120, the network device 110 may transmit control information 135 associated with the transmission of the data 140. For example, the control information 135 can schedule a set of resources for the transmission of the data 140 and indicate various transmission parameters related to the transmission of data 140, such as, one or more TCI states, a Frequency Domain Resource Assignment (FDRA), a Time Domain Resource Assignment (TDRA) which may include a slot offset and a start/length indicator value, a Demodulation Reference Signal (DMRS) group, a Redundancy Version (RV), as defined in the 3GPP specifications. It is to be understood that the transmission parameters indicated in the control information 135 are not limited to the ones as listed above. Embodiments of the present disclosure may equally applicable to control information including any transmission parameters.

In some embodiments, the control information 135 may be a DCI as defined in the 3GPP specifications, which can indicate various transmission parameters dynamically, namely, on a relatively short time scale. In some other embodiments, the control information 135 may be a Radio Resource Control (RRC) message or a Medium Access Control (MAC) Control Element (CE) message, which can indicate various transmission parameters semi-statically, that is, on a relatively long time scale.

Although some embodiments of the present disclosure are described with reference to the first and second TRPs 131 and 132 within a same serving cell provided by the network device 110, these embodiments are only for the purpose of illustration and help those skilled in the art to understand and implement the present disclosure, without suggesting any limitations on the scope of the present disclosure. It is to be understood that embodiments of the present disclosure described herein can be implemented in various manners other than the ones described below.

It is to be understood that the number of network devices, the number of terminal devices, and the number of TRPs as shown in FIG. 1 are only for the purpose of illustration without suggesting any limitations. Actually, the communication environment 100 may include any suitable number of network devices, any suitable number of terminal devices, and any suitable number of TRPs adapted for implementing embodiments of the present disclosure. In other words, embodiments of the present disclosure may also be applicable to a scenario where a terminal device communicates with more than one network device, or a network device coupled with more than two TRPs.

The communications in the communication environment 100 may conform to any suitable standards including, but not limited to, Global System for Mobile Communications (GSM), Extended Coverage Global System for Mobile Internet of Things (EC-GSM-IoT), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

As specified in the 3GPP specifications, if a UE is configured with the higher layer parameter tci-PresentInDCI that is set as 'enabled' for the CORESET scheduling the physical downlink shared channel (PDSCH), the UE assumes that the TCI field is present in the DCI format 1_1 of the PDCCH transmitted on the CORESET. If tci-PresentInDCI is not configured for the CORESET scheduling the PDSCH or the PDSCH is scheduled by a DCI format 1_0, for determining PDSCH antenna port quasi co-location, the UE assumes that the TCI state for the PDSCH is identical to the TCI state applied for the CORESET used for the PDCCH transmission.

If the tci-PresentInDCI is set as 'enabled', when the PDSCH is scheduled by DCI format 1_1, the UE shall use the TCI-State according to the value of the 'Transmission Configuration Indication' field in the detected PDCCH with DCI for determining PDSCH antenna port quasi co-location. The UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold Threshold-Sched-Offset, where the threshold is based on reported UE capability.

In current specifications, there may be a TCI field in downlink control information (DCI), and a terminal device may be configured with a TCI state, and the TCI state may contain parameters for configuring a QCL relationship between one or two downlink reference signals and the DMRS ports of the PDSCH. The terminal device may be configured with a DMRS type and/or a maximum number/length of DMRS and/or the number of codewords. If the terminal device is configured with a given DMRS type, a given value of the maximum number/length of DMRS, and a given value of the number of codewords, there is one corresponding table for indication of at least one of antenna ports, the number of DMRS CDM group(s) without data, the number of front-loaded DMRS symbols, the number of DMRS port(s), and the index(es) for DMRS port(s).

In some embodiments, if more than one (for example, two) DMRS groups are configured for a terminal device, there may be one or two TCI states configured in one DCI for the terminal device. In some embodiments, the number of the TCI states in one DCI depends on the QCL relationship between the DMRS ports from the two DMRS groups. For example, if the DMRS ports from the two DMRS groups are not QCLed with each other with respect to at least one of QCL-TypeA, QCL-TypeB, QCL-TypeC and QCL-TypeD, the number of TCI states in one DCI may be 2. For another example, if the DMRS ports from the two DMRS groups are QCLed with each other with respect to {Doppler shift, Doppler spread, average delay, average spread, Spatial Rx parameter} and/or average gain, the number of TCI states in one DCI may be 1.

In some embodiments, the number of the TCI states in one DCI depends on the number of DMRS ports. For example, if the number of DMRS ports is 2, the number of TCI states in one DCI may be 2. For example, the two TCI states in one DCI may be same or different from each other. For another example, if the number of DMRS ports is 1, the number of TCI states in one DCI may be 1.

Generally, a network device (for example, an eNB or a gNB) may transmit downlink reference signals (RSs) such as Demodulation Reference Signal (DMRS), Channel State Information-Reference Signal (CSI-RS), Sounding Reference Signal (SRS), Phase Tracking Reference Signal (PT-RS), fine time and frequency Tracking Reference Signal (TRS) and the like. A terminal device (for example, user equipment) in the system may receive the downlink RSs on allocated resources. The terminal device may also transmit uplink RSs to the network device on corresponding allocated resources. For indicating the allocated resources and/or other necessary information for the RSs, the network device may transmit RS configurations to the terminal device prior to the transmissions of the RSs.

In other words, in addition to normal data communications, the network device 110 may transmit downlink reference signals (RSs) in a broadcast, multi-cast, and/or unicast manner to one or more of the terminal devices 120 in a downlink (DL). Similarly, one or more of the terminal devices 120 may transmit RSs to the network device 110 in an uplink (UL). Examples of the RSs may include but are not limited to downlink or uplink Demodulation Reference Signal (DMRS), Channel State Information-Reference Signal (CSI-RS), Sounding Reference Signal (SRS), Phase Tracking Reference Signal (PT-RS), fine time and frequency Tracking Reference Signal (TRS) and so on.

As used herein, a RS is a signal sequence (also referred to as "RS sequence") that is known by both the network device 110 and the terminal device 120. For example, a RS sequence may be generated and transmitted by the network device 110 based on a certain rule and the terminal device 120 may deduce the RS sequence based on the same rule. In transmission of downlink and uplink RSs, the network device 110 may allocate corresponding resources (also referred to as "RS resources") for the transmission and/or specify which RS sequence is to be transmitted.

In some scenarios, both the network device 110 and the terminal device 120 are equipped with multiple antenna ports (or antenna elements) and can transmit specified RS sequences with the antenna ports (antenna elements). A set of RS resources associated with a number of RS ports are also specified. A RS port may be referred to as a specific mapping of part or all of a RS sequence to one or more resource elements (REs) of a resource region allocated for RS transmission in time, frequency, and/or code domains. Such resource allocation information may be indicated to the terminal device 120 prior to the transmission of the RSs.

In NR, PT-RS can be introduced to enable compensation for phase noise. Generally, the phase noise increases as the carrier frequency increases, so PT-RS can be used to eliminate phase noise for a wireless network operating in high frequency bands. Currently, PT-RS mapping patterns in time and frequency domains have been studied, but detailed patterns have not been designed completely. For example, it has been agreed that the density of PT-RS in time domain (also referred to as "the time density" of PT-RS) is associated with Modulation and Coding Scheme (MCS) being scheduled, while the density of PT-RS in frequency domain (also referred to as "the frequency density" of PT-RS) and the group pattern of PT-RS ports (such as, the number of PT-RS groups and the number of samples per PT-RS group) are associated with a scheduled BW (such as, the number of scheduled RBs).

For an OFDM-based system, the time density of PT-RS may be one of the following: zero (that is, PT-RS is not present), every 4th symbol (that is, ¼), every 2nd symbol (that is, ½), or every symbol (that is, 1). The time density of PT-RS is associated with the scheduled MCS. For example, Table 5.1.6.3-1 of 3GPP TS 38.214 as below shows the association between the scheduled MCS and the time density of PT-RS. In Table 5.1.6.3-1, ptrs-MCS 1 to ptrs-MCS4 each represent a MCS threshold which needs to be configured by the network device.

TABLE 5.1.6.3-1

Time density of PT-RS as a function of scheduled MCS

| Scheduled MCS | Time density ($L_{PT-RS}$) |
|---|---|
| $I_{MCS}$ < ptrs-MCS$_1$ | PT-RS is not present |
| ptrs-MCS1 ≤ Imcs < ptrs-MCS2 | 4 |
| ptrs-MCS2 ≤ Imcs < ptrs-MCS3 | 2 |
| ptrs-MCS3 ≤ Imcs < ptrs-MCS4 | 1 |

Similarly, the frequency density of PT-RS may be one of the following: zero (that is, PT-RS is not present), every RB (that is, 1), every 2nd RB (that is, ½), or every 4th RB (that is, ¼). The frequency density of PT-RS is associated with the scheduled bandwidth (that is, the number of scheduled RBs). For example, Table 5.1.6.3-2 of 3GPP TS 38.214 as below shows the association between the scheduled bandwidth (represented as $N_{RB}$) and the frequency density of PT-RS. In Table 5.1.6.3-2, $N_{RB0}$ and $N_{RB1}$ each represent a bandwidth threshold which needs to be configured by the network device.

TABLE 5.1.6.3-2

Frequency density of PT-RS as a function of scheduled PRBs

| Scheduled PRBs | Frequency density ($K_{PT-RS}$) |
|---|---|
| $N_{RB}$ < $N_{RB0}$ | PT-RS is not present |
| $N_{RB0}$ ≤ $N_{RB}$ < $N_{RB1}$ | 2 |
| $N_{RB1}$ ≤ $N_{RB}$ | 4 |

It has been agreed that single-DCI based M-TRP URLLC schemes 2a and 2b support the following design. Comb-like frequency resource allocation between/among TRPs. For wideband Precoding Resource Block Group (PRG), first ⌈N_RB/2⌉ RBs are assigned to TCI state 1 (also referred to as TCI state A) and the remaining ⌊N_RB/2⌋ RBs are assigned to TCI state 2 (also referred to as TCI state B). For PRG size=2 or 4, even PRGs within the allocated FDRA are assigned to TCI state 1 and odd PRGs within the allocated FDRA are assigned to TCI state 2.

Regarding the PRG, as defined in the 3GPP specifications, a UE may assume that precoding granularity is $P_{BWP}^i$ consecutive resource blocks in the frequency domain. $P_{BWP}^i$ can be equal to one of the values among {2, 4, wideband}. If $P_{BWP}^i$ is determined as "wideband," the UE is not expected to be scheduled with non-contiguous PRBs and the UE may assume that the same precoding is applied to the allocated resource. If $P_{BWP}^i$ is determined as one of the values among {2, 4}, Precoding Resource Block Group (PRGs) partitions the bandwidth part i with $P_{BWP}^i$ consecutive PRBs. Actual number of consecutive PRBs in each PRG could be one or more.

In view of the above, for URLLC scheme 2a/2b, if the total scheduled number of PRBs is N, based on the agreement, a part of PRBs are assigned to each TCI state. While how to determine the specific configuration or mapping of the PT-RSs for each TCI state is not clear, for example, how to obtain the PT-RS density and PRBs for PT-RS mapping is not designed.

In order to solve the above technical problems and potentially other technical problems in conventional solutions, embodiments of the present disclosure provide a solution for configuring PT-RSs, especially the PT-RS presence/density/pattern/offset, based on a multi-TRP transmission. In some embodiments, for the scheme 2a/2b based multi-TRP transmission, the PT-RS presence/density/pattern/offset is independent/separate decided in each part of the scheduled resources. In some other embodiments, the PT-RS presence/density is same for two or more parts of the scheduled resources and decided based on the largest part in the two or more parts. In some further embodiments, the PT-RS offset is same for two or more parts and decided based on the smallest part in the two or more parts. Embodiments of the present disclosure provide practical details on how to decide PT-RS presence/density/pattern/offset if a scheduled set of resources are shared by a plurality of TCI states, especially in case of scheme 2a/2b. Principles and implementations of the present disclosure will be described in detail below.

Figure 2:
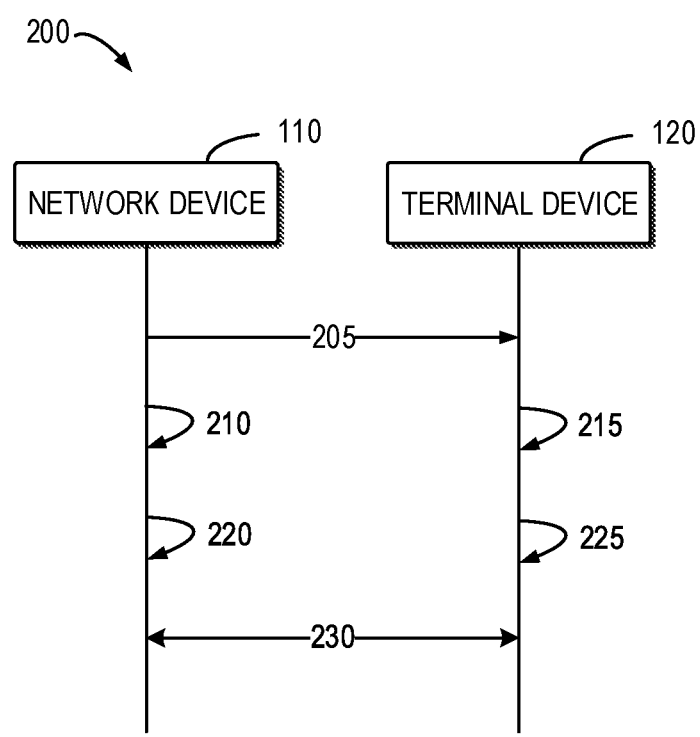
FIG. 2 shows an example communication process between a network device and a terminal device in accordance with some embodiments of the present disclosure.

FIG. 2 shows an example communication process 200 between the network device 110 and the terminal device 120 in accordance with some embodiments of the present disclosure. For the purpose of discussion, the communication process 200 will be described with reference to FIG. 1. However, it would be appreciated that the communication process 200 may be equally applicable to any other communication scenarios where a network device and a terminal device communicate with each other.

As shown in FIG. 2, the network device 110 transmits 205 the control information 135 to the terminal device 120. Accordingly, the terminal device 120 receives 205 the control information 135 from the network device 110. In some embodiments, the control information 135 may be downlink control information (DCI) as defined in the 3GPP specifications. In some other embodiments, the control information 135 may include any existing or future signaling as defined in the 3GPP specifications or other standard specifications. The control information 135 may indicate a set of resources and more than one TCI states for a communication between the terminal device 120 and the network device 110, for example, a transmission of the data 140.

In some embodiments, the set of resources may include a plurality of physical resource blocks (PRBs) as defined in the 3GPP specifications. However, in some other embodiments, the set of resources can be in any other forms as defined in the 3GPP specifications or other standard specifications. In addition, in some embodiments, the TCI states may include up to eight TCI states as defined in the 3GPP specifications. However, in some other embodiments, the TCI states may include any existing or future transmission configuration indication states that have similar or same functions as that defined in the 3GPP specifications. An example of the set of resources and the TCI states will be described below with reference to FIG. 3.

Figure 3:
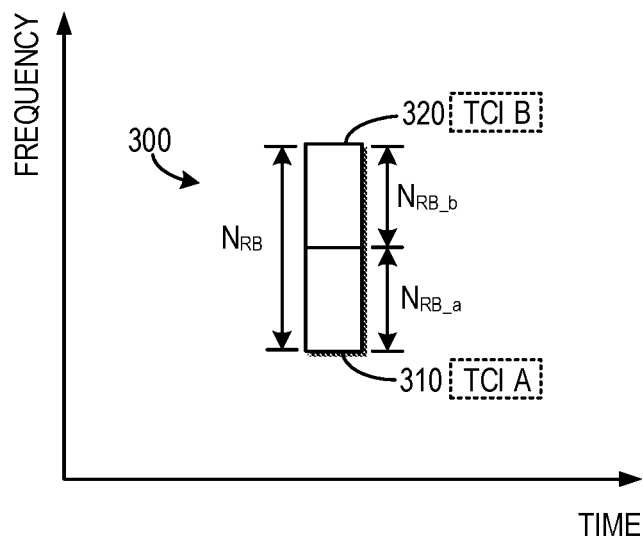
FIG. 3 shows an example set of resources divided in frequency domain into two resource subsets associated with two TCI states, in accordance with some embodiments of the present disclosure.

FIG. 3 shows an example set of resources 300 divided in frequency domain into two resource subsets 310 and 320 associated with two TCI states, a TCI state A and a TCI state B, in accordance with some embodiments of the present disclosure. In FIG. 3, the horizontal axis represents the time domain, and the vertical axis represents the frequency domain. As shown, the control information 135 transmitted by the network device 110 to the terminal device 120 can indicate the set of resources 300, for example, the time and frequency positions of the set of resources 300, and the control information 135 may also indicate two of the eight TCI states as defined in 3GPP specifications, for example, the TCI state A and the TCI state B. The set of resources 300 as well as the TCI state A and the TCI state B are to be used in a communication between the terminal device 120 and the network device 110, for example, the transmission of data 140.

Referring back to FIG. 2, the network device 110 determines 210 resource subsets associated with the respective TCI states, and each resource subset is a part of the set of resources in frequency domain. In a similar way, the terminal device 120 also determines 215 the resource subsets associated with the respective TCI states. For example, with reference to FIG. 3, the network device 110 or the terminal device 120 can determine a resource subset 310 associated with the TCI state A and a resource subset 320 associated with the TCI state B. It can be seen that the resource subsets 310 and 320 are two parts of the set of resources 300 in frequency domain.

It is to be understood that the number of TCI states, the wideband PRG configuration of the set of resources 300, and the specific partition manner of the set of resources 300 as shown in FIG. 3 are only for the purpose of illustration without suggesting any limitations. In other embodiments, there may be any suitable number of TCI states indicated in the control information 135, the set of resources 300 may have any suitable PRG configuration, and the set of resources 300 can be divided in any suitable manner into any number of subsets associated with the respective TCI states.

Referring back to FIG. 2, the network device 110 determines 220 a mapping of PT-RSs to the resource subsets, for example, to determine for the respective resource subsets, whether PT-RSs are to be transmitted to the terminal device 120 or to be received from the terminal device 120, and if PT-RSs are to be transmitted or received, which resources in a resource subset are to be used. Likewise, the terminal device 120 also determines 225 the mapping of PT-RSs to the resource subsets. For example, with reference to FIG. 3, the network device 110 or the terminal device 120 can determine how the PT-RSs are to be mapped to resources in the resource subsets 310 and 320, respectively. There are various possible options for mapping the PT-RSs to resources in the resource subsets, which will be described one by one in the following.

In a first option, the mapping of the PT-RSs in each of the resource subsets can be determined independently. For example, the PT-RS mapping in each resource subset can be based on resources (such as, PRBs) for each TCI state. With this straightforward option, a most suitable mapping can be configured for each of the resource subsets, namely, for each of the TCI states. In particular, for the scheme 2a/2b, the scheduled PRBs for the PDSCH are divided into two parts and the PT-RS mapping for each part is independent. In other words, the PT-RS presence/pattern/mapping is per part of the scheduled PRBs.

More specifically, if a UE is configured with single-DCI based M-TRP URLLC scheme 2a and 2b, and if the UE is configured with more than one (for example, two or three or four) TCI states in one TCI codepoint, then the PT-RS presence/density/mapping is based on the scheduled PRBs assigned/associated to each TCI state. That is, the network device 110 or the terminal device 120 can determine respective values of a mapping parameter (such as, the frequency density of the PT-RSs, the PT-RS resource offset, or the like) for the resource subsets, respectively. For instance, with reference to FIG. 3, the mapping of the PT-RSs to resources can be determined for the resource subsets 310 and 320, separately. In particular, for the scheme 2a/2b, the PT-RS on two parts of scheduled PRBs assigned/associated to two TCI states are independently.

In some embodiments, there may be two TCI states in one TCI codepoint, for example the two TCI states may be TCI state A and TCI state B. As an example of the first option, the frequency density of the PT-RSs can be configured for the resource subsets independently. As such, the most appropriate frequency density of the PT-RSs can be determined for each resource subset. To this end, the network device 110 or the terminal device 120 may determine, for each of the resource subsets, a frequency density of the PT-RSs based on the number of resources in the resource subset. For example, as shown in FIG. 3, it is assumed that the number of resources (for example, PRBs) assigned/associated to TCI state A (the resource subset 310) is $N_{RB\_a}$, and the number of resources (for example, PRBs) assigned/associated to TCI state B (the resource subset 320) is $N_{RB\_b}$. For example, the total number of resource blocks or the scheduled bandwidth for the PDSCH scheduled by the single DCI may be $N_{RB}$. For example, $N_{RB\_a}+N_{RB\_b}=N_{RB}$.

Therefore, the frequency density of the PT-RSs in the resource subset 310 can be determined based on $N_{RB\_a}$, and the frequency density of the PT-RS in the resource subset 320 can be determined based on $N_{RB\_b}$. For instance, based on Table 5.1.6.3-2 as defined in the 3GPP TS 38.214, the PT-RS frequency density in the resource subset 310 can be decided by replacing the parameter "$N_{RB}$" with "$N_{RB\_a}$," and the PT-RS frequency density in the resource subset 320 can be decided by replacing the parameter "$N_{RB}$" with "$N_{RB\_b}$."

As another example of the first option, the PT-RS resource offset can be configured for the resource subsets independently. As such, the most appropriate PT-RS resource offset can be determined for each resource subset. To this end, the network device 110 or the terminal device 120 may determine, for each of the resource subsets and based on the number of resources, the frequency density and an identifier of the terminal device, an offset between a starting resource for the mapping and the resource with the lowest frequency in the resource subset. For example, with reference to FIG. 3, the PT-RS resource offset in the resource subset 310 can be determined based on $N_{RB\_a}$, and the PT-RS resource offset in the resource subset 320 can be determined based on $N_{RB\_b}$.

More specifically, based on the below formula (1) as defined in section 7.4.1.2.2 of 3GPP TS 38.211, the PT-RS resource offset in the resource subset 310 can be decided by replacing the parameter "$N_{RB}$" with "$N_{RB\_a}$," and the PT-RS resource offset in resource subset 320 can be decided by replacing the parameter "$N_{RB}$" with "$N_{RB\_b}$." Other parameters in the formula (1) are defined in the 3GPP specifications.

$$k = k_{ref}^{RE} + (iK_{PT-RS} + k_{ref}^{RB})N_{sc}^{RB} \quad (1)$$

$$k_{ref}^{RB} = \begin{cases} n_{RNTI} \bmod K_{PT-RS} & \text{if } N_{RB} \bmod K_{PT-RS} = 0 \\ n_{RNTI} \bmod (N_{RB} \bmod K_{PT-RS}) & \text{otherwise} \end{cases}$$

In some embodiments, with the above discussed first option, section 5.1.6.3 of the current technical specification 3GPP TS 38.214 can be updated as follows.

5.1.6.3 PT-RS Reception Procedure

If a UE is configured with single-DCI based M-TRP URLLC scheme 2a and 2b, (and/or if the UE is configured with more than one (for example, two or three or four) TCI state in one TCI codepoint,) the UE shall assume the PT-RS antenna port presence and pattern according to each part of scheduled PRBs assigned/associated to each TCI state.

If a UE is configured with the higher layer parameter phaseTrackingRS in DMRS-DownlinkConfig,
  the higher layer parameters timeDensity and frequencyDensity in PTRS-DownlinkConfig indicate the threshold values ptrs-$MCS_i$, i=1, 2, 3 and $N_{RB,i}$, i=0,1, as shown in Table 5.1.6.3-1 and Table 5.1.6.3-2, respectively.
  if either or both of the additional higher layer parameters timeDensity and frequencyDensity are configured, and the RNTI equals MCS-C-RNTI, C-RNTI or CS-RNTI, the UE shall assume the PT-RS antenna port' presence and pattern is a function of the corresponding scheduled MCS of the corresponding codeword and scheduled PRBs associated with one TCI state in corresponding bandwidth part as shown in Table 5.1.6.3-1 and Table 5.1.6.3-2,
    if the higher layer parameter timeDensity given by PTRS-DownlinkConfig is not configured, the UE shall assume $L_{PT-RS}=1$.
    if the higher layer parameter frequencyDensity given by PTRS-DownlinkConfig is not configured, the UE shall assume $K_{PT-RS}=2$.
  otherwise, if neither of the additional higher layer parameters timeDensity and frequencyDensity are configured and the RNTI equals MCS-C-RNTI, C-RNTI or CS-RNTI, the UE shall assume the PT-RS is present with $L_{PT-RS}=1$, $K_{PT-RS}=2$, and the UE shall assume PT-RS is not present when
    the scheduled MCS from Table 5.1.3.1-1 is smaller than 10, or
    the scheduled MCS from Table 5.1.3.1-2 is smaller than 5, or
    the scheduled MCS from Table 5.1.3.1-3 is smaller than 15, or
    $N_{RB}$ is smaller than 3, (and $N_{RB}$ is the scheduled PRBs assigned/associated with one TCI state if a UE is configured with single-DCI based M-TRP URLLC scheme 2a and 2b, and $N_{RB}$ is the scheduled bandwidth otherwise), or
  otherwise, if the RNTI equals RA-RNTI, SI-RNTI, or P-RNTI, the UE shall assume PT-RS is not present

TABLE 5.1.6.3-1

Time density of PT-RS as a function of scheduled MCS

| Scheduled MCS | Time density ($L_{PT-RS}$) |
| --- | --- |
| $I_{MCS}$ < ptrs-$MCS_1$ | PT-RS is not present |
| ptrs-MCS1 < Imcs < ptrs-MCS2 | 4 |
| ptrs-MCS2 ≤ Imcs < ptrs-MCS3 | 2 |
| ptrs-MCS3 ≤ Imcs < ptrs-MCS4 | 1 |

TABLE 5.1.6.3-2

Frequency density of PT-RS as a function of scheduled PRBs

| Scheduled PRBs | Frequency density ($K_{PT-RS}$) |
| --- | --- |
| $N_{RB}$ < $N_{RB0}$ | PT-RS is not present |
| $N_{RB0}$ ≤ $N_{RB}$ < $N_{RB1}$ | 2 |
| $N_{RB1}$ ≤ $N_{RB}$ | 4 |

In some embodiments, with the above discussed first option, section 5.1.6.3 of the current technical specification 3GPP TS 38.214 can be updated as follows.

5.1.6.3 PT-RS Reception Procedure

If a UE is configured with single-DCI based M-TRP URLLC scheme 2a and 2b, (and/or if the UE is configured with more than one (for example, two or three or four) TCI state in one TCI codepoint,) the UE shall assume the PT-RS antenna port presence and pattern according to each part of scheduled PRBs assigned/associated to each TCI state.

If a UE is configured with the higher layer parameter phaseTrackingRS in DMRS-DownlinkConfig, the higher layer parameters timeDensity and frequencyDensity in PTRS-DownlinkConfig indicate the threshold values ptrs-$MCS_i$, i=1, 2, 3 and $N_{RB,i}$, i=0,1, as shown in Table 5.1.6.3-1 and Table 5.1.6.3-2, respectively.

if either or both of the additional higher layer parameters timeDensity and frequencyDensity are configured, and the RNTI equals MCS-C-RNTI, C-RNTI or CS-RNTI, the UE shall assume the PT-RS antenna port' presence and pattern is a function of the corresponding scheduled MCS of the corresponding codeword and $N_{RB}$, and $N_{RB}$ is the scheduled PRBs assigned/associated with one TCI state if a UE is configured with single-DCI based M-TRP URLLC scheme 2a and 2b, (and/or if the UE is configured with more than one (for example, two or three or four) TCI state in one TCI codepoint, and $N_{RB}$ is the scheduled bandwidth otherwise) in corresponding bandwidth part as shown in Table 5.1.6.3-1 and Table 5.1.6.3-2, if the higher layer parameter timeDensity given by PTRS-DownlinkConfig is not configured, the UE shall assume $L_{PT-RS}=1$.

if the higher layer parameter frequencyDensity given by PTRS-DownlinkConfig is not configured, the UE shall assume $K_{PT-RS}=2$.

otherwise, if neither of the additional higher layer parameters timeDensity and frequencyDensity are configured and the RNTI equals MCS-C-RNTI, C-RNTI or CS-RNTI, the UE shall assume the PT-RS is present with $L_{PT-RS}=1$, $K_{PT-RS}=2$, and the UE shall assume PT-RS is not present when the scheduled MCS from Table 5.1.3.1-1 is smaller than 10, or the scheduled MCS from Table 5.1.3.1-2 is smaller than 5, or the scheduled MCS from Table 5.1.3.1-3 is smaller than 15, or $N_{RB}$ is smaller than 3, (and $N_{RB}$ is the scheduled PRBs assigned/associated with one TCI state if a UE is configured with single-DCI based M-TRP URLLC scheme 2a and 2b, and $N_{RB}$ is the scheduled bandwidth otherwise), or otherwise, if the RNTI equals RA-RNTI, SI-RNTI, or P-RNTI, the UE shall assume PT-RS is not present

TABLE 5.1.6.3-1

Time density of PT-RS as a function of scheduled MCS

| Scheduled MCS | Time density ($L_{PT-RS}$) |
|---|---|
| $I_{MCS}$ < ptrs-$MCS_1$ | PT-RS is not present |
| ptrs-MCS1 ≤ $I_{mcs}$ < ptrs-MCS2 | 4 |
| ptrs-MCS2 ≤ $I_{mcs}$ < ptrs-MCS3 | 2 |
| ptrs-MCS3 ≤ $I_{mcs}$ < ptrs-MCS4 | 1 |

TABLE 5.1.6.3-2

Frequency density of PT-RS as a function of scheduled PRBs

| Scheduled PRBs | Frequency density ($K_{PT-RS}$) |
|---|---|
| $N_{RB}$ < $N_{RB0}$ | PT-RS is not present |
| $N_{RB0}$ ≤ $N_{RB}$ < $N_{RB1}$ | 2 |
| $N_{RB1}$ ≤ $N_{RB}$ | 4 |

In some embodiments, with the above discussed first option, section 7.4.1.2.2 of the current technical specification 3GPP TS 38.211 can be updated as follows.

7.4.1.2.2 Mapping to Physical Resources

If a UE is configured with single-DCI based M-TRP URLLC scheme 2a and 2b, (and/or if the UE is configured with more than one (for example, two or three or four) TCI state in one TCI codepoint,) the UE shall assume phase-tracking reference signals being present only in the resource blocks assigned/associated to each TCI state for the PDSCH, otherwise the UE shall assume phase-tracking reference signals being present only in the resource blocks used for the PDSCH, and only if the procedure in [6, TS 38.214] indicates phase-tracking reference signals being used.

The UE shall assume phase-tracking reference signals being present only in the resource blocks assigned/associated to each TCI state used for the PDSCH, and only if the procedure in [6, TS 38.214] indicates phase-tracking reference signals being used.

If present, the UE shall assume the PDSCH PT-RS is scaled by a factor $\beta_{PT-RS,i}$ to conform with the transmission power specified in clause 4.1 of [6, TS 38.214] and mapped to resource elements $(k, l)_{p,\mu}$ according to $$a_{k,l}^{(p,\mu)}=\beta_{PT-RS,i} r_k$$

when all the following conditions are fulfilled l is within the OFDM symbols allocated for the PDSCH transmission resource element $(k, l)_{p,\mu}$ is not used for DM-RS, non-zero-power CSI-RS (except for those configured for mobility measurements or with resourceType in corresponding CSI-ResourceConfig configured as 'aperiodic'), zero-power CSI-RS, SS/PBCH block, a detected PDCCH according to clause 5.1.4.1 of [6, TS38.214], or is declared as 'not available' by clause 5.1.4 of [6, TS 38.214]

The set of time indices l defined relative to the start of the PDSCH allocation is defined by 1. set i=0 and $l_{ref}=0$
2. if any symbol in the interval max($l_{ref}+(i-1)L_{PT-RS}+1$, $l_{ref}$), . . . , $l_{ref}+iL_{PT-RS}$ overlaps with a symbol used for DM-RS according to clause 7.4.1.1.2
   set i=1
   set $l_{ref}$ to the symbol index of the DM-RS symbol in case of a single-symbol DM-RS and to the symbol index of the second DM-RS symbol in case of a double-symbol DM-RS
   repeat from step 2 as long as $l_{ref}+iL_{PT-RS}$ is inside the PDSCH allocation
3. add $l_{ref}+iL_{PT-RS}$ to the set of time indices for PT-RS
4. increment i by one
5. repeat from step 2 above as long as $l_{ref}+iL_{PT-RS}$ is inside the PDSCH allocation
   where $L_{PT-RS} \in \{1,2,4\}$.

For the purpose of PT-RS mapping, if a UE is configured with single-DCI based M-TRP URLLC scheme 2a and 2b, (and/or if the UE is configured with more than one (for example, two or three or four) TCI states in one TCI codepoint,) the resource blocks allocated for PDSCH transmission are numbered from 0 to $N_{RB}-1$ from the lowest scheduled resource block assigned/associated to each TCI state to the highest; otherwise, the resource blocks allocated for PDSCH transmission are numbered from 0 to $N_{RB}-1$ from the lowest scheduled resource block to the highest. The corresponding subcarriers in this set of resource blocks are numbered in increasing order starting from the lowest frequency from 0 to $N_{sc}^{RB}N_{RB}-1$. The subcarriers to which the UE shall assume the PT-RS is mapped are given by $$k = k_{ref}^{RE} + (iK_{PT\text{-}RS} + k_{ref}^{RB})N_{sc}^{RB}$$

$$k_{ref}^{RB} = \begin{cases} n_{RNTI} \bmod K_{PT\text{-}RS} & \text{if } N_{RB} \bmod K_{PT\text{-}RS} = 0 \\ n_{RNTI} \bmod (N_{RB} \bmod K_{PT\text{-}RS}) & \text{otherwise} \end{cases}$$

where i=0, 1, 2, . . . .

$k_{ref}^{RE}$ is given by Table 7.4.1.2.2-1 for the DM-RS port associated with the PT-RS port according to clause 5.1.6.2 in [6, TS 38.214]. If the higher-layer parameter resourceElementOffset in the PTRS-DownhnkConfig IE is not configured, the column corresponding to '00' shall be used.

$n_{RNTI}$ is the RNTI associated with the DCI scheduling the transmission $N_{RB}$ is the scheduled PRBs assigned/associated with one TCI state if a UE is configured with single-DCI based M-TRP URLLC scheme 2a and 2b, (and if the UE is configured with more than one (or two) TCI state in one TCI codepoint,) and the number of resource blocks scheduled otherwise $K_{PT\text{-}RS} \in \{2,4\}$ is given by [6, TS 38.214].

TABLE 7.4.1.2.2-1

The parameter $k_{ref}^{RE}$.

| DM-RS antenna port | DM-RS Configuration type 1 resourceElementOffset | | | | DM-RS Configuration type 2 resourceElementOffset | | | |
|---|---|---|---|---|---|---|---|---|
| p | 00 | 01 | 10 | 11 | 00 | 01 | 10 | 11 |
| 1000 | 0 | 2 | 6 | 8 | 0 | 1 | 6 | 7 |
| 1001 | 2 | 4 | 8 | 10 | 1 | 6 | 7 | 0 |
| 1002 | 1 | 3 | 7 | 9 | 2 | 3 | 8 | 9 |
| 1003 | 3 | 5 | 9 | 11 | 3 | 8 | 9 | 2 |
| 1004 | — | — | — | — | 4 | 5 | 10 | 11 |
| 1005 | — | — | — | — | 5 | 10 | 11 | 4 |

As an alternative to the first option, in a second option for mapping the PT-RSs to the resource subsets, a common value of a mapping parameter can be configured for all the resource subsets, based on the numbers of resources in respective resource subsets. For example, the frequency density of the PT-RSs, the PT-RS resource offset, or the like in all the resource subsets may be configured to be the same. In particular, for the scheme 2a/2b, the PT-RS on two parts of scheduled PRBs assigned/associated to two TCI states can be as same as possible. With a common value of a mapping parameter for all the resource subsets, the performance of the communication between the network device 110 and the terminal device 120 may be improved, since the resource subsets may be associated with TCI states for transmitting a same codeword of the data 140.

As an example of the second option, a common value of the frequency density of the PT-RSs can be configured for all the resource subsets. In this way, the distribution of the PT-RSs in different resource subsets may be as uniform as possible. To determine this common value of the frequency density, the network device 110 or the terminal device 120 can determine the numbers of resources in the respective resource subsets. For example, with reference to FIG. 3, it is assumed that the number of resources (for example, PRBs) assigned/associated to the TCI state A (the resource subset 310) is $N_{RB\_a}$, and the number of resources (for example, PRBs) assigned/associated to the TCI state B (the resource subset 320) is $N_{RB\_b}$. Then, the network device 110 or the terminal device 120 may determine a maximum number in the numbers of resources in the respective resource subsets. For example, in FIG. 3, the maximum of $N_{RB\_a}$ and $N_{RB\_b}$, denoted by max ($N_{RB\_a}$, $N_{RB\_b}$), can be determined.

Next, the network device 110 or the terminal device 120 may determine a common frequency density of the PT-RSs in all the resource subsets based on the maximum number. For example, with reference to FIG. 3, the parameter "$N_{RB}$" in Table 5.1.6.3-2 as specified in the 3GPP specification TS 38.214 can be replaced by the max ($N_{RB\_a}$, $N_{RB\_b}$) to determine the common frequency density of the PT-RSs, which can be applied for both the resource subsets 310 and 320. Therefore, for the scheme 2a/2b, the PT-RS frequency density is based on the larger one of the two parts associated with two TCI states, and the presence/density of PT-RS is the same for the two parts. By using the maximum number of resources among the resource subsets, the individual calculations of the frequency densities of the PT-RSs based on the individual numbers of resources can be avoided.

As another example of the second option, a common value of the frequency density of the PT-RSs can be configured for all the resource subsets. In this way, the distribution of the PT-RSs in different resource subsets may be as uniform as possible. To determine this common value of the frequency density, the network device 110 or the terminal device 120 can determine the numbers of resources in the respective resource subsets. For example, with reference to FIG. 3, it is assumed that the number of resources (for example, PRBs) assigned/associated to the TCI state A (the resource subset 310) is $N_{RB\_a}$, and the number of resources (for example, PRBs) assigned/associated to the TCI state B (the resource subset 320) is $N_{RB\_b}$. Then, the network device 110 or the terminal device 120 may determine a minimum number in the numbers of resources in the respective resource subsets. For example, in FIG. 3, the minimum of $N_{RB\_a}$ and $N_{RB\_b}$, denoted by min ($N_{RB\_a}$, $N_{RB\_b}$), can be determined.

Next, the network device 110 or the terminal device 120 may determine a common frequency density of the PT-RSs in all the resource subsets based on the minimum number. For example, with reference to FIG. 3, the parameter "$N_{RB}$" in Table 5.1.6.3-2 as specified in the 3GPP specification TS 38.214 can be replaced by the min ($N_{RB\_a}$, $N_{RB\_b}$) to determine the common frequency density of the PT-RSs, which can be applied for both the resource subsets 310 and 320. Therefore, for the scheme 2a/2b, the PT-RS frequency density is based on the smaller one of the two parts associated with two TCI states, and the presence/density of PT-RS is the same for the two parts. By using the minimum number of resources among the resource subsets, the individual calculations of the frequency densities of the PT-RSs based on the individual numbers of resources can be avoided.

As an alternative for determining the common frequency density for the subsets 310 and 320, the network device 110 or the terminal device 120 may determine frequency densities of the PT-RSs in the respective resource subsets, based on the numbers of resources in the respective resource subsets. For example, with reference to FIG. 3, based on Table 5.1.6.3-2 as defined in 3GPP TS 38.214, the PT-RS presence/density for subset 310 may be determined as d1 by replacing the parameter "$N_{RB}$" with "$N_{RB\_a}$," and the PT-RS presence/density for subset 320 may be determined as d2 by replacing the parameter "$N_{RB}$" with "$N_{RB\_b}$."

Then, the network device 110 or the terminal device 120 may determine the mapping based on a maximum frequency density of the frequency densities. In other words, for the scheme 2a/2b, the frequency density for PT-RS in the whole scheduled PRBs for the PDSCH is the same, and the density can be determined as max (d1, d2). In some embodiments, if for at least one part, the PT-RSs are present, then the PT-RSs are present in the whole scheduled PRBs. For example, PTRS may be present for one part, and absent for the other part, then PTRS should be present for both parts. By comparing the individually calculated frequency densities, the comparison of the individual numbers of resources in the resource subsets can be avoided.

As another example of the second option, a common value of the PT-RS resource offset can be configured for the resource subsets. In this way, the distribution of the PT-RSs in different resource subsets may be as uniform as possible. To determine this common value of the PT-RS resource offset, the network device 110 or the terminal device 120 may determine offsets between starting resources for the mapping and resources with the lowest frequency in the respective resource subsets, based on the numbers of resources in respective resource subsets, the frequency densities in respective resource subsets and an identifier of the terminal device.

For example, with reference to FIG. 3, it is assumed that the number of resources (for example, PRBs) assigned/associated to TCI state A (the subset 310) is $N_{RB\_a}$, and the number of resources (for example, PRBs) assigned/associated to TCI state B (the subset 320) is $N_{RB\_b}$. The frequency densities in the respective resource subsets can be determined as above based on Table 5.1.6.3-2 as defined in 3GPP TS 38.214. The identifier of the terminal device 120 is known to the network device 110 and the terminal device 120. Then, the network device 110 and the terminal device 120 can determine respective offsets, for example, $k_{ref}^{RB\_a}$ and $k_{ref}^{RB\_b}$, for the resource subsets 310 and 320 using the above formula (1) as defined in the 3GPP TS 38.211.

Then, the network device 110 or the terminal device 120 may determine the mapping of the PT-RSs for all the resource subsets based on a minimum offset of the offsets. In other words, the minimum offset can be used as the common value of the PT-RS resource offset for all the resource subsets. For instance, with reference to FIG. 3, the PT-RS resource offset in the whole scheduled PRBs for the PDSCH is the same, and the PT-RS resource offset can be determined as min ($k_{ref}^{RB\_a}$, $k_{ref}^{RB\_b}$). As such, the common value of the PT-RS resource offset can be determined by using an existing formula (1) and comparing the calculated offsets for the respective resource offsets.

As an alternative for determining the common PT-RS resource offset value for the subsets, a common value of the PT-RS resource offset may be based on the smallest one of the resource subsets, that is, the one having the smallest number of resources. For example, with reference to FIG. 3, it is assumed that the number of resources (for example, PRBs) assigned/associated to the TCI state A (the resource subset 310) is $N_{RB\_a}$, and the number of resources (for example, PRBs) assigned/associated to the TCI state B (the resource subset 320) is $N_{RB\_b}$.

Then, the network device 110 or the terminal device 120 may determine the common value of the PT-RS resource offset based on the below formula (2). That is, for the scheme 2a/2b, the resource offset for the two parts associated with two TCI states is same, and the value can be determined as below:

$$k_{ref}^{RB} = \begin{cases} n_{RNTI} \bmod K_{PT-RS} & \text{if } N_{RB\_a} \bmod K_{PT-RS} = 0 \text{ and } N_{RB\_b} \bmod K_{PT-RS} = 0 \\ n_{RNTI} \bmod (\min(N_{RB\_a} \bmod K_{PT-RS}, N_{RB\_b} \bmod K_{PT-RS})) & \text{otherwise} \end{cases} \quad (2)$$

In the formula (2), other parameters are defined in 3GPP specifications, for example, TS 38.211 and TS 38.214. With this formula (2), the final common value $k_{ref}^{RB}$ can be directly determined without calculating and comparing individual PT-RS resource offsets for the resource subsets.

In a third option for mapping the PT-RSs to the resource subsets, the mapping of the PT-RSs to the resource subsets can be determined based on the whole set of resources indicated in the control information 135 (that is, the scheduled bandwidth). In other words, a common value of a mapping parameter can be configured for the resource subsets, based on the whole set of resources instead of respective numbers of resources in the resource subsets. For example, for the repetition scheme 2a/2b, the configuration of the PT-RSs, namely the PT-RS presence/density/mapping, on two parts of scheduled PRBs assigned/associated to two TCI states may be based on the whole scheduled bandwidth.

As an example of the third option, the network device 110 or the terminal device 120 can determine, based on the number of resources in the set of resources, a common frequency density of the PT-RSs in the resource subsets. For example, with reference to FIG. 3, it is assumed that the number of resources of the set of resources 300 is $N_{RB}$. Then, the common value of the frequency density of the PT-RSs in the resource subsets 310 and 320 can be determined based on $N_{RB}$, for example, through Table 5.1.6.3-2 as defined in 3GPP TS 38.214.

Then, the network device 110 or the terminal device 120 may map, based on the common frequency density, PT-RSs to the resource subsets in an order of one resource subset after another resource subset. In other words, for the scheme 2a/2b, the PT-RS mapping order is that the PT-RSs are mapped on one part of scheduled PRBs assigned/associated to one TCI state and then mapped on the other part of scheduled PRBs assigned/associated to the other TCI state. For instance, with reference to FIG. 3, the mapping of the PT-RSs is performed on the resource subset 310, and then performed on the resource subset 320. In this way, the distribution of the PT-RSs in different resource subsets may be as uniform as possible.

As another example of the third option, the network device 110 or the terminal device 120 can determine, based on the number of resources in the set of resources multiplied by the number of the resource subsets, a common frequency density of the PT-RSs in the resource subsets. In particular, the PT-RS frequency density is based on Table 5.1.6.3-2 as defined in 3GPP TS 38.214, while for the scheme 2a/2b, the $N_{RB}$ in the table is replaced with 2*number of scheduled PRBs, namely, twice the number of scheduled PRBs. For instance, with reference to FIG. 3, the common value of the frequency density of the PT-RSs in the resource subsets 310 and 320 can be determined based on $2N_{RB}$, since the set of resources 300 is divided into two subsets. As such, the calculation of the common value of the frequency density of the PT-RSs can be simplified, without determining individual numbers of the resources in the resource subsets.

As a further example of the third option, the network device 110 or the terminal device 120 may determine, based on the number of resources in the set of resources, an initial frequency density of the PT-RSs. For instance, with reference to FIG. 3, the initial frequency density of the PT-RSs can be determined based on $N_{RB}$ using Table 5.1.6.3-2 as defined in 3GPP TS 38.214. Then, the network device 110 or the terminal device 120 can determine the mapping based on a minimum of ½ and the initial frequency density multiplied by the number of the resource subsets.

In particular, for the scheme 2a/2b, the PT-RS frequency density is based on Table 5.1.6.3-2 as defined in 3GPP TS 38.214, and the final density is min (½, 2*density) or min (1, 2*density). For instance, with reference to FIG. 3, the common value of the frequency density of the PT-RSs in the resource subsets 310 and 320 can be twice the value determined based on $N_{RB}$, if this value is less than ½ or 1, thereby preventing the frequency density of the PT-RSs being too high, and thus avoiding potential interference due to the transmission of PT-RSs. Additionally, in this manner, the calculation of the common value of the frequency density of the PT-RSs can be simplified, without determining individual numbers of the resources in the resource subsets.

As a still further example of the third option, for the scheme 2a/2b, the PT-RS frequency density can be based on a newly-designed table different from Table 5.1.6.3-2 as defined in the 3GPP specification TS 38.214. In this way, the frequency density of the PT-RSs in the resource subsets can be determined in any other suitable manner without the restriction of Table 5.1.6.3-2 as defined in the 3GPP specifications. For example, the new table may be shown in Table 1 as below.

TABLE 1

Frequency density of PT-RS as a function of scheduled PRBs

| Scheduled PRBs | Frequency density ($K_{PT-RS}$) |
|---|---|
| $N_{RB} < N_{RB0}$ | PT-RS is not present |
| $N_{RB0} \leq N_{RB} < N_{RB1}$ | 1 |
| $N_{RB1} \leq N_{RB}$ | 2 |
| $N_{RB3} \leq N_{RB}$ | 4 |

Referring back to FIG. 2, after determining the mapping of the PT-RSs to the resources subsets, the network device 110 and the terminal device 120 can perform 230 a PT-RS transmission between them. For example, if downlink PT-RSs are transmitted between the network device 110 and the terminal device 120, then for each TCI state, the network device 110 transmits the PT-RSs to the terminal device 120 in the resource subset associated with the TCI state according to the determined mapping. At the receiving side, the terminal device 120 receives the PT-RSs from the network device 110 in the resource subset associated with the TCI state according to the determined mapping.

Alternatively, if uplink PT-RSs are transmitted between the network device 110 and the terminal device 120, then for each TCI state, the terminal device 120 transmits the PT-RSs to the network device 110 in the resource subset associated with the TCI state according to the determined mapping. At the receiving side, the network device 110 receives the PT-RSs from the terminal device 120 in the resource subset associated with the TCI state according to the determined mapping.

Figure 4:
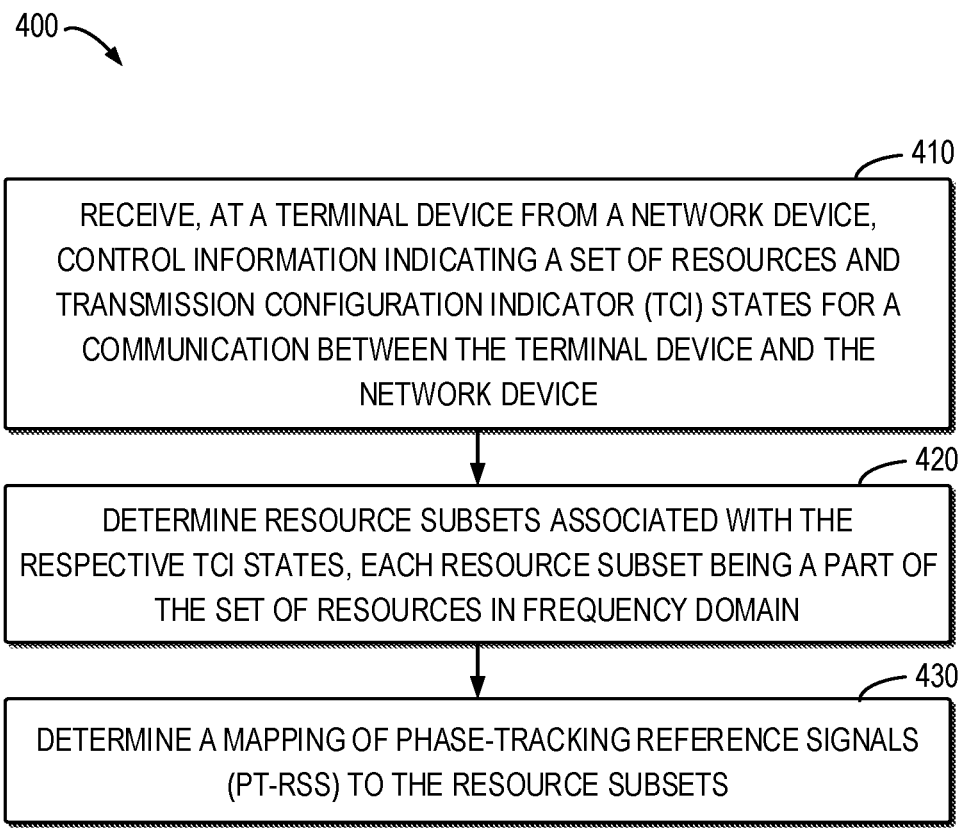
FIG. 4 shows a flowchart of an example method in accordance with some embodiments of the present disclosure.

FIG. 4 shows a flowchart of another example method 400 in accordance with some embodiments of the present disclosure. In some embodiments, the method 400 can be implemented at a terminal device, such as the terminal device 120 as shown in FIG. 1. Additionally or alternatively, the method 400 can also be implemented at other terminal devices not shown in FIG. 1. For the purpose of discussion, the method 400 will be described with reference to FIG. 1 as performed by the terminal device 120 without loss of generality.

At block 410, a terminal device receives, from a network device, control information indicating a set of resources and TCI states for a communication between the terminal device and the network device. At block 420, the terminal device determines resource subsets associated with the respective TCI states, each resource subset being a part of the set of resources in frequency domain. At block 430, the terminal device determines a mapping of PT-RSs to the resource subsets.

In some embodiments, determining the mapping comprises: determining values of a mapping parameter for the resource subsets respectively; or determining a common value of a mapping parameter for the resource subsets.

In some embodiments, determining the mapping comprises: determining, for each of the resource subsets, a frequency density of the PT-RSs based on the number of resources in the resource subset.

In some embodiments, determining the mapping further comprises: determining, for each of the resource subsets and based on the number, the frequency density and an identifier of the terminal device, an offset between a starting resource for the mapping and the resource with the lowest frequency in the resource subset.

In some embodiments, determining the mapping comprises: determining the numbers of resources in the respective resource subsets; determining a maximum number in the numbers; and determining, based on the maximum number, a common frequency density of the PT-RSs in the resource subsets.

In some embodiments, determining the mapping comprises: determining, based on the numbers of resources in the respective resource subsets, frequency densities of the PT-RSs in the respective resource subsets; and determining the mapping based on a maximum frequency density of the frequency densities.

In some embodiments, determining the mapping further comprises: determining, based on the numbers, the frequency densities and an identifier of the terminal device, offsets between starting resources for the mapping and resources with the lowest frequency in the respective resource subsets; and determining the mapping based on a minimum offset of the offsets.

In some embodiments, determining the mapping comprises: determining, based on the number of resources in the set of resources, a common frequency density of the PT-RSs in the resource subsets; and mapping, based on the common frequency density, PT-RSs to the resource subsets in an order of one resource subset after another resource subset.

In some embodiments, determining the mapping comprises: determining, based on the number of resources in the set of resources multiplied by the number of the resource subsets, a common frequency density of the PT-RSs in the resource subsets.

In some embodiments, determining the mapping comprises: determining, based on the number of resources in the set of resources, an initial frequency density of the PT-RSs; and determining the mapping based on a minimum of ½ and the initial frequency density multiplied by the number of the resource subsets.

Figure 5:
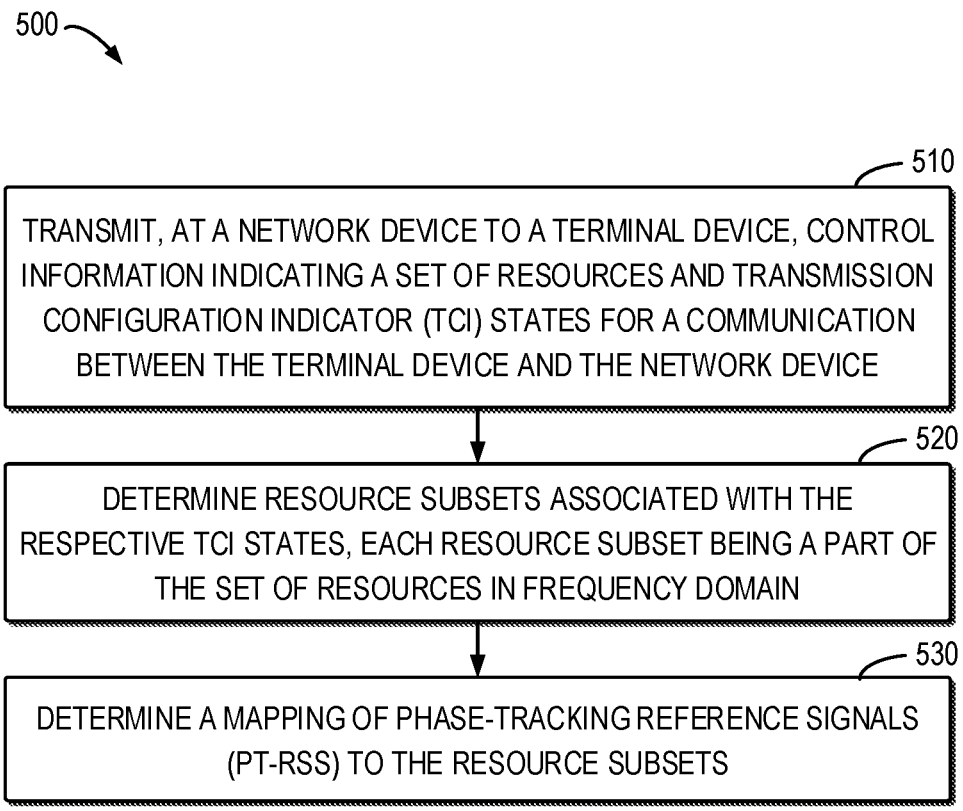
FIG. 5 shows a flowchart of another example method in accordance with some embodiments of the present disclosure.

FIG. 5 shows a flowchart of another example method 500 in accordance with some embodiments of the present disclosure. In some embodiments, the method 500 can be implemented at a network device, such as the network device 110 as shown in FIG. 1. Additionally or alternatively, the method 500 can also be implemented at other network devices not shown in FIG. 1. For the purpose of discussion, the method 500 will be described with reference to FIG. 1 as performed by the network device 110 without loss of generality.

At block 510, a network device transmits, to a terminal device, control information indicating a set of resources and TCI states for a communication between the terminal device and the network device. At block 520, the network device determines resource subsets associated with the respective TCI states, each resource subset being a part of the set of resources in frequency domain. At block 530, the network device determines a mapping of PT-RSs to the resource subsets.

In some embodiments, determining the mapping comprises: determining values of a mapping parameter for the resource subsets respectively; or determining a common value of a mapping parameter for the resource subsets.

In some embodiments, determining the mapping comprises: determining, for each of the resource subsets, a frequency density of the PT-RSs based on the number of resources in the resource subset.

In some embodiments, determining the mapping further comprises: determining, for each of the resource subsets and based on the number, the frequency density and an identifier of the terminal device, an offset between a starting resource for the mapping and the resource with the lowest frequency in the resource subset.

In some embodiments, determining the mapping comprises: determining the numbers of resources in the respective resource subsets; determining a maximum number in the numbers; and determining, based on the maximum number, a common frequency density of the PT-RSs in the resource subsets.

In some embodiments, determining the mapping comprises: determining, based on the numbers of resources in the respective resource subsets, frequency densities of the PT-RSs in the respective resource subsets; and determining the mapping based on a maximum frequency density of the frequency densities.

In some embodiments, determining the mapping further comprises: determining, based on the numbers, the frequency densities and an identifier of the terminal device, offsets between starting resources for the mapping and resources with the lowest frequency in the respective resource subsets; and determining the mapping based on a minimum offset of the offsets.

In some embodiments, determining the mapping comprises: determining, based on the number of resources in the set of resources, a common frequency density of the PT-RSs in the resource subsets; and mapping, based on the common frequency density, PT-RSs to the resource subsets in an order of one resource subset after another resource subset.

In some embodiments, determining the mapping comprises: determining, based on the number of resources in the set of resources multiplied by the number of the resource subsets, a common frequency density of the PT-RSs in the resource subsets.

In some embodiments, determining the mapping comprises: determining, based on the number of resources in the set of resources, an initial frequency density of the PT-RSs; and determining the mapping based on a minimum of ½ and the initial frequency density multiplied by the number of the resource subsets.

Figure 6:
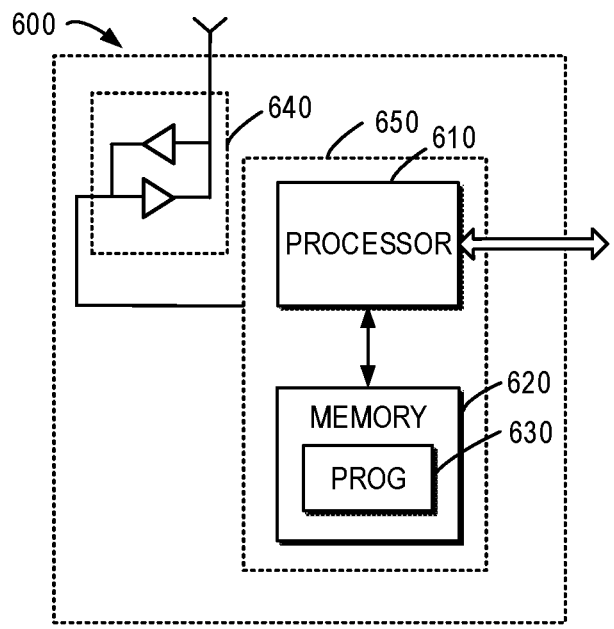
FIG. 6 is a simplified block diagram of a device that is suitable for implementing some embodiments of the present disclosure.

FIG. 6 is a simplified block diagram of a device 600 that is suitable for implementing some embodiments of the present disclosure. The device 600 can be considered as a further example embodiment of the network device 110 and the terminal device 120 as shown in FIG. 1. Accordingly, the device 600 can be implemented at or as at least a part of the network device 110 and the terminal device 120.

As shown, the device 600 includes a processor 610, a memory 620 coupled to the processor 610, a suitable transmitter (TX) and receiver (RX) 640 coupled to the processor 610, and a communication interface coupled to the TX/RX 640. The memory 620 stores at least a part of a program 630. The TX/RX 640 is for bidirectional communications. The TX/RX 640 has at least one antenna to facilitate communication, though in practice an Access Node mentioned in this application may have several ones. The communication interface may represent any interface that is necessary for communication with other network elements, such as X2 interface for bidirectional communications between gNBs or eNBs, S1 interface for communication between a Mobility Management Entity (MME)/Serving Gateway (S-GW) and the gNB or eNB, Un interface for communication between the gNB or eNB and a relay node (RN), or Uu interface for communication between the gNB or eNB and a terminal device.

The program 630 is assumed to include program instructions that, when executed by the associated processor 610, enable the device 600 to operate in accordance with the embodiments of the present disclosure, as discussed herein with reference to any of FIGS. 4 and 5. The embodiments herein may be implemented by computer software executable by the processor 610 of the device 600, or by hardware, or by a combination of software and hardware. The processor 610 may be configured to implement various embodiments of the present disclosure. Furthermore, a combination of the processor 610 and memory 620 may form processing means 650 adapted to implement various embodiments of the present disclosure.

The memory 620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 620 is shown in the device 600, there may be several physically distinct memory modules in the device 600. The processor 610 may be of any type suitable to the local technical network, and may include one or more of general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The components included in the apparatuses and/or devices of the present disclosure may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 4 and 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for a terminal device, comprising:
    receiving, from a network device, downlink control information (DCI) comprising at least two physical resource blocks (PRBs) and at least two transmission configuration indicator (TCI) states for a communication between the terminal device and the network device;
    determining resource subsets associated with each of the TCI states, each resource subset being a part of the set of resource blocks in frequency domain; and
    wherein a mapping of phase-tracking reference signals (PT-RS) is associated with to the resource subsets, and a PT-RS frequency density is determined based on a number of PRBs associated to the respective TCI state in the DCI.

2. The method of claim 1, further comprising:
    determining values of a mapping parameter for the resource subsets respectively; or
    determining a common value of a mapping parameter for the resource subsets.

3. The method of claim 1, further comprising:
    determining, for each of the resource subsets and based on a number, the frequency density and an identifier of the terminal device, an offset between a starting resource for the mapping and the resource with a lowest frequency in the resource subset.

4. The method of claim 1, further comprising:
    determining the numbers of resources in the respective resource subsets;

determining a maximum number in the numbers; and
determining, based on the maximum number, a common frequency density of the PT-RSs in the resource subsets.

5. The method of claim 1, further comprising:
determining, based on the numbers of resources in the respective resource subsets, frequency densities of the PT-RSs in the respective resource subsets; and
determining the mapping based on a maximum frequency density of the frequency densities.

6. The method of claim 5, further comprising:
determining, based on the numbers, the frequency densities and an identifier of the terminal device, offsets between starting resources for the mapping and resources with the lowest frequency in the respective resource subsets; and
determining the mapping based on a minimum offset of the offsets.

7. The method of claim 1, further comprising:
determining, based on the number of resources in the set of resources, a common frequency density of the PT-RSs in the resource subsets; and
mapping, based on the common frequency density, PT-RSs to the resource subsets in an order of one resource subset after another resource subset.

8. The method of claim 1, further comprising:
determining, based on the number of resources in the set of resources multiplied by the number of the resource subsets, a common frequency density of the PT-RSs in the resource subsets.

9. The method of claim 1, further comprising:
determining, based on the number of resources in the set of resources, an initial frequency density of the PT-RSs; and
determining the mapping based on a minimum of ½ and the initial frequency density multiplied by the number of the resource subsets.

10. A method for a terminal device, comprising:
transmitting, from at a network device to a terminal device, downlink control information (DCI) comprising at least two physical resource blocks (PRBs) and at least two transmission configuration indicator (TCI) states for a communication between the terminal device and the network device;
determining resource subsets associated with each of the TCI states, each resource subset being a part of the set of resource blocks in frequency domain; and
wherein a mapping of phase-tracking reference signals (PT-RS) is associated with the resource subsets, and a PT-RS frequency density is determined based on a number of PRBs associated to the respective TCI state in the DCI.

11. The method of claim 10, further comprising:
determining values of a mapping parameter for the resource subsets respectively; or
determining a common value of a mapping parameter for the resource subsets.

12. The method of claim 10, further comprising:
determining, for each of the resource subsets and based on a number, the frequency density and an identifier of the terminal device, an offset between a starting resource for the mapping and the resource with a lowest frequency in the resource subset.

13. The method of claim 10, further comprising:
determining the numbers of resources in the respective resource subsets;
determining a maximum number in the numbers; and
determining, based on the maximum number, a common frequency density of the PT-RSs in the resource subsets.

14. The method of claim 10, further comprising:
determining, based on the numbers of resources in the respective resource subsets, frequency densities of the PT-RSs in the respective resource subsets; and
determining the mapping based on a maximum frequency density of the frequency densities.

15. The method of claim 14, further comprising:
determining, based on the numbers, the frequency densities and an identifier of the terminal device, offsets between starting resources for the mapping and resources with the lowest frequency in the respective resource subsets; and
determining the mapping based on a minimum offset of the offsets.

16. The method of claim 10, further comprising:
determining, based on the number of resources in the set of resources, a common frequency density of the PT-RSs in the resource subsets; and
mapping, based on the common frequency density, PT-RSs to the resource subsets in an order of one resource subset after another resource subset.

17. The method of claim 10, further comprising:
determining, based on the number of resources in the set of resources multiplied by the number of the resource subsets, a common frequency density of the PT-RSs in the resource subsets.

18. The method of claim 10, further comprising:
determining, based on the number of resources in the set of resources, an initial frequency density of the PT-RSs; and
determining the mapping based on a minimum of ½ and the initial frequency density multiplied by the number of the resource subsets.

* * * * *